United States Patent
Eschenbacher, Jr. et al.

(10) Patent No.: US 11,167,787 B2
(45) Date of Patent: Nov. 9, 2021

(54) COLLAPSIBLE STEERING COLUMN ASSEMBLY

(71) Applicant: STEERING SOLUTIONS IP HOLDING CORPORATION, Saginaw, MI (US)

(72) Inventors: Floyd E. Eschenbacher, Jr., Freeland, MI (US); Edwin J. Nab, Jr., Saginaw, MI (US); Jeremy M. Zemla, Owosso, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 29 days.

(21) Appl. No.: 16/366,689

(22) Filed: Mar. 27, 2019

(65) Prior Publication Data
US 2019/0300043 A1    Oct. 3, 2019

Related U.S. Application Data

(60) Provisional application No. 62/650,515, filed on Mar. 30, 2018.

(51) Int. Cl.
*B62D 1/19* (2006.01)
*B62D 1/20* (2006.01)

(52) U.S. Cl.
CPC ............... *B62D 1/192* (2013.01); *B62D 1/20* (2013.01)

(58) Field of Classification Search
CPC . B62D 1/19; B62D 1/192; B62D 1/20; B62D 5/006; B62D 5/0409
See application file for complete search history.

(56) References Cited

U.S. PATENT DOCUMENTS

| | | | | |
|---|---|---|---|---|
| 5,421,591 A * | 6/1995 | Katzensteiner | ...... | B60K 17/306 277/550 |
| 5,975,609 A * | 11/1999 | Campbell | ............. | B60R 13/083 296/39.3 |
| 6,280,340 B1 * | 8/2001 | Masuda | ................ | B60K 17/22 29/525 |
| 6,540,618 B1 * | 4/2003 | MacDonald | ............ | B62D 1/16 464/173 |
| 2002/0103589 A1 * | 8/2002 | Millsap | ................ | B62D 5/006 701/42 |
| 2002/0108804 A1 * | 8/2002 | Park | ...................... | B62D 5/005 180/444 |

(Continued)

FOREIGN PATENT DOCUMENTS

| CN | 107344564 A | 11/2017 |
|---|---|---|
| CN | 107531268 A | 1/2018 |
| DE | 102016210833 A1 | 12/2017 |

OTHER PUBLICATIONS

English translation of Office Action regarding related DE App. No. 10 2019 108 014.2; dated Mar. 3, 2020.

(Continued)

*Primary Examiner* — Frank B Vanaman
(74) *Attorney, Agent, or Firm* — Dickinson Wright PLLC

(57) ABSTRACT

A steering column assembly includes a jacket assembly. The steering column assembly also includes a steering actuator operatively coupled to the jacket assembly with a connector plate, the connector plate defining an opening having a main portion and a channel extending radially outward from the main portion of the opening.

3 Claims, 5 Drawing Sheets

(56) References Cited

U.S. PATENT DOCUMENTS

| | | | | |
|---|---|---|---|---|
| 2003/0146037 A1* | 8/2003 | Menjak | .................. | B62D 5/006 |
| | | | | 180/402 |
| 2003/0146038 A1* | 8/2003 | Mills | ...................... | B62D 5/001 |
| | | | | 180/422 |
| 2005/0250586 A1* | 11/2005 | Yamada | ................... | F16J 15/52 |
| | | | | 464/170 |
| 2009/0085302 A1* | 4/2009 | Helfert | ................. | F16J 15/3284 |
| | | | | 277/404 |
| 2009/0260914 A1* | 10/2009 | Streng | ................. | B62D 5/0409 |
| | | | | 180/444 |
| 2009/0270188 A1* | 10/2009 | Yamada | ................... | B62D 1/20 |
| | | | | 464/162 |
| 2017/0146129 A1* | 5/2017 | Allen | ................... | F16J 15/3224 |
| 2017/0320515 A1* | 11/2017 | Levesque | ............... | B62D 5/001 |

OTHER PUBLICATIONS

English translation of Office Action regarding related CN App. No. 2019102558570; dated Apr. 2, 2021.

\* cited by examiner

COLLAPSIBLE STEERING COLUMN ASSEMBLY

CROSS-REFERENCE TO RELATED APPLICATION

This application claims the benefit of priority to U.S. Provisional Patent Application Ser. No. 62/650,515, filed on Mar. 30, 2018, the entirety of the disclosure being incorporated herein.

BACKGROUND

The present disclosure is related to a collapsible steering column assembly.

Steer-by-wire steering column assemblies may not have a mechanical connection between a steering wheel and a steering gear. The mechanical connection may be replaced by a simulated road feel device, such as a servomotor that is connected to a steering shaft that is connected to the steering gear. The collapsing of the steer-by-wire steering column may absorb kinetic energy during a steering column collapse event. However, considerations associated with packaging and component interference must be addressed for such collapsing assemblies.

SUMMARY

According to an aspect of the disclosure, a steering column assembly includes a jacket assembly. The steering column assembly also includes a steering actuator operatively coupled to the jacket assembly with a connector plate, the connector plate defining an opening having a main portion and a channel extending radially outward from the main portion of the opening.

According to another aspect of the disclosure, provided is a hand wheel actuator connector plate operatively connecting a jacket assembly and a hand wheel actuator, the connector plate defining an opening having a main portion and a channel extending radially outward from the main portion of the opening.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
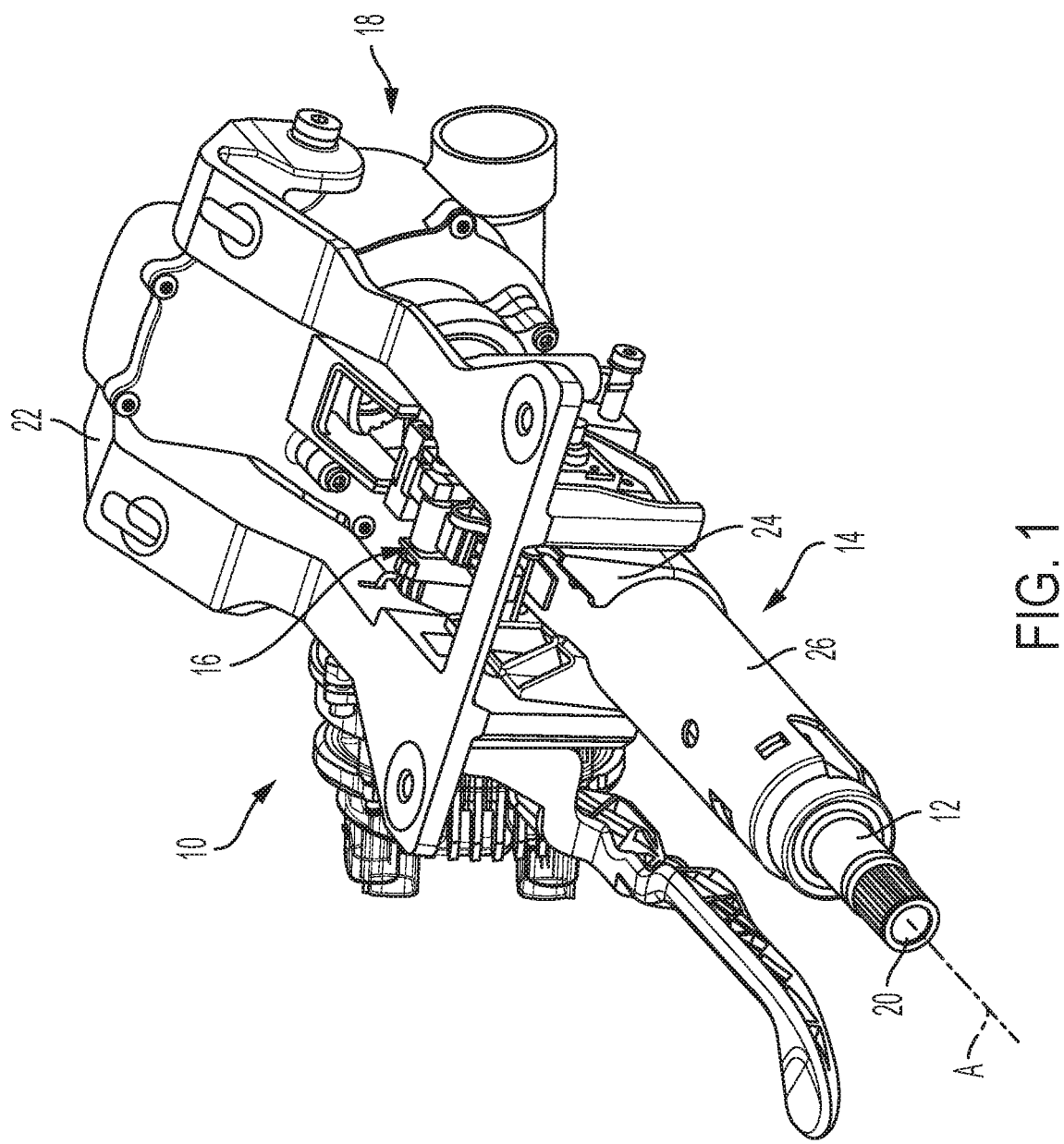
FIG. 1 is a perspective view of a steering column assembly.

Referring to FIG. 1, a steering column assembly 10 is shown. The steering column assembly 10 includes a steering shaft 12, a jacket assembly 14, an energy absorption assembly 16, and a steering actuator 18. The steering column assembly 10 is a collapsible steering column assembly that is collapsible over a collapse zone. The collapse zone includes a first collapse zone defined by the jacket assembly 14 and a second collapse zone that is defined by the steering actuator 18. At least a portion of the steering column assembly 10, such as the jacket assembly 14, may translate or move from the first collapse zone towards the second collapse zone during a steering column collapse event.

The steering shaft 12 extends longitudinally along a steering axis A. The steering shaft 12 extends at least partially through the jacket assembly 14 and the steering actuator 18 along the steering axis A. The steering shaft 12 extends between a steering shaft first end 20 and a steering shaft second end (not shown). The steering shaft first end 20 is configured to attach to a steering wheel. The steering shaft second end, or proximate thereto is configured to be operatively connected to the steering actuator 18, i.e., connection of the steering shaft 12 to the steering actuator 18 is made closer to the steering shaft second end than the steering shaft first end 20.

The steering shaft 12 extends at least partially through the jacket assembly 14. The jacket assembly 14 is configured to carry or rotatably support the steering shaft 12. The jacket assembly 14 connects the steering column assembly 10 to a vehicle structure through a mounting bracket 22. The jacket assembly 14 includes a lower jacket assembly 24 and an upper jacket assembly 26. The upper jacket assembly 26 is at least partially received within the lower jacket assembly 24. The upper jacket assembly 26 is capable of retracting or collapsing within the lower jacket assembly 24 in response to a steering column collapse event.

The energy absorption assembly 16 may extend between the lower jacket assembly 24 and the upper jacket assembly 26. The energy absorption assembly 16 is configured to provide a drag load or force opposing translation of the upper jacket assembly 26 relative to the lower jacket assembly 24 during a steering column collapse event as the jacket assembly 14 moves from the first collapse zone towards the second collapse zone. The drag load or force opposing translation may be adaptive or variable based on the configuration of the energy absorption assembly 16. The energy absorption assembly 16 and the upper jacket assembly 26 may collapse into the steering actuator 18.

The steering actuator 18 is connected to the jacket assembly 14 and the steering shaft 12. The steering actuator 18 may also be referred to as "hand wheel actuator." The steering actuator 18 is arranged as an electromechanical actuator that replaces a direct mechanical connection between the steering shaft 12 and a steering gear 18. In other words, the steering actuator 18 is operatively connected to a vehicle wheel with an electronic or virtual connection, such that the steering column assembly 10 is a steer-by-wire steering assembly in some embodiments. The steering actuator 18 is configured to interpret a position of at least one of the steering shaft 12 and the steering wheel connected to the steering shaft first end 20 and to provide that position as a steering input to the steering gear 18 operatively connected to a vehicle wheel to pivot the vehicle wheel. The steering actuator 18 may also be configured to provide a rotational input or other input to the steering shaft 12 to provide an artificial road feel to the operator of the vehicle.

Figure 2:
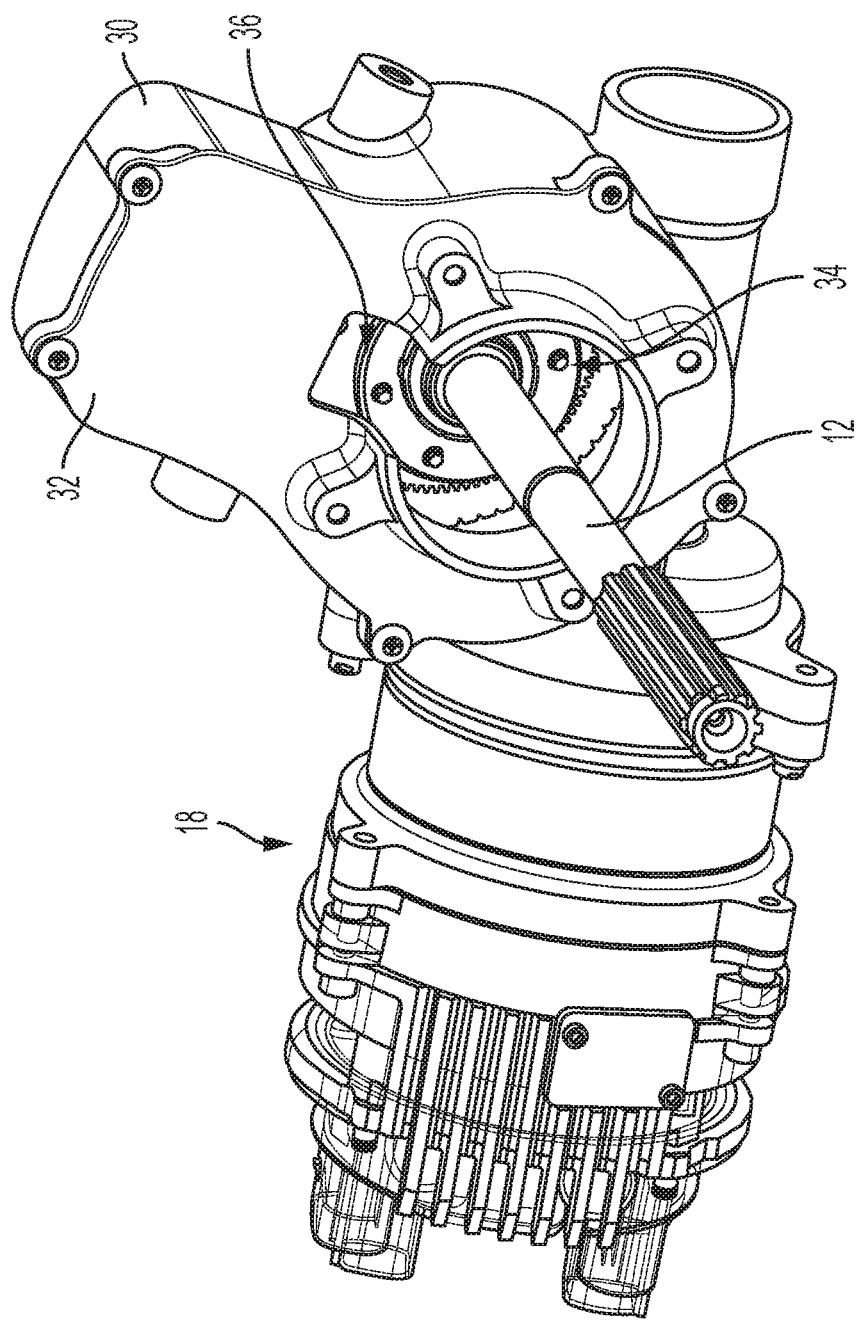
FIG. 2 is a perspective view of a steering actuator of the steering column assembly.

Referring to FIG. 2, the steering actuator 18 includes an actuator housing 30 and a connector plate 32. The actuator housing 30 receives components of the steering actuator 18 such as sensors and a gear assembly that is drivably connected to a portion of the steering shaft 12. The connector plate 32 is disposed on the actuator housing 30 and connects the steering actuator 18 to at least one of the upper jacket assembly 26 and/or the lower jacket assembly 24.

The connector plate 32 may also be referred to as a hand wheel actuator connector plate. The connector plate 32 is disposed between the jacket assembly 14 and the steering actuator 18. The connector plate 32 separates the jacket assembly 14 from the steering actuator 18. The connector plate 32 is a rigid member that defines an opening 34. The connector plate 32 also defines a channel 36 that extends radially outwardly from the opening 34. In other words, the opening 34 is a main portion of an aperture of the connector plate 32 and the channel 36 is part of the overall aperture that extends from the opening 34 to provide additional space for an object to pass through, as described herein. The channel 36 is sized such that during or after a steering column collapse event, at least a portion of the energy absorption assembly 16 is received by or slides through the channel 36 and is at least partially received within the actuator housing 30.

Figure 4:
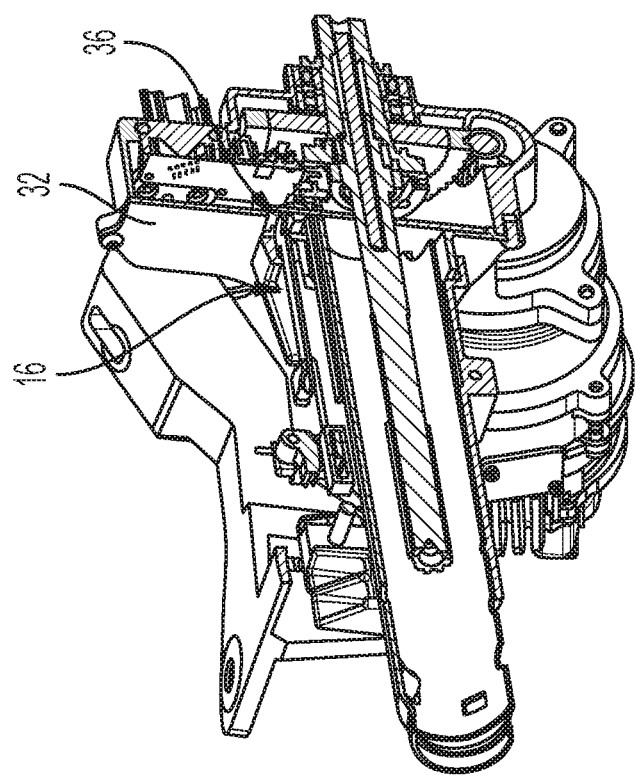
FIG. 4 is a partial cross-section of the steering column assembly after a steering column collapse event.
Figure 3:
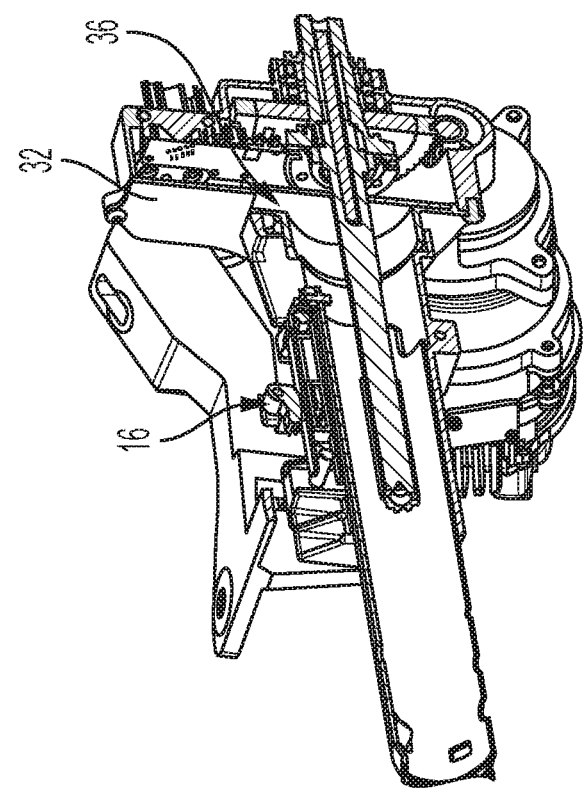
FIG. 3 is a partial cross-section of the steering column assembly prior to a steering column collapse event.

The benefit of the channel 36 is illustrated in FIGS. 3 and 4. FIG. 3 illustrates the steering column assembly 10—and more specifically the energy absorption assembly 16—in a first position that corresponds to a non-collapsed position. FIG. 4 illustrates the steering column assembly 10—and more specifically the energy absorption assembly 16—in a second position that corresponds to a collapsed, or partially collapsed, position. As shown in FIG. 4, one or more components (e.g., energy absorption strap) of the energy absorption assembly 16 requires additional radial space to translate through the connector plate 32. The inclusion of the channel 36 increases the stroke range capability of the jacket collapse during a steering column collapse event by allowing the jacket assembly 14, and a portion of the energy absorption assembly 16, to penetrate or enter or pass through the connector plate 32.

Figure 6:
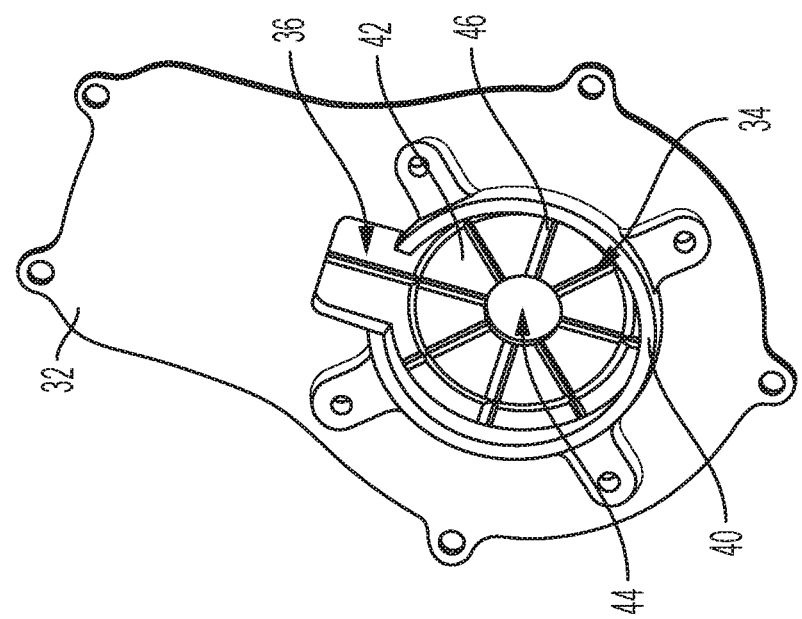
FIG. 6 is a perspective view of the connector plate having a sealing member according to another aspect of the disclosure.
Figure 5:
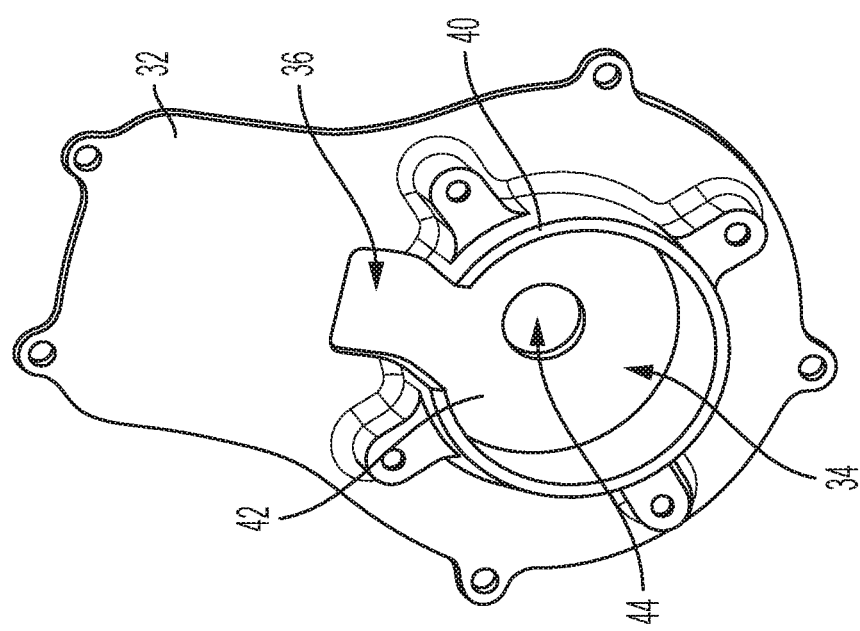
FIG. 5 is a perspective view of a connector plate having a sealing member.
Figure 7:
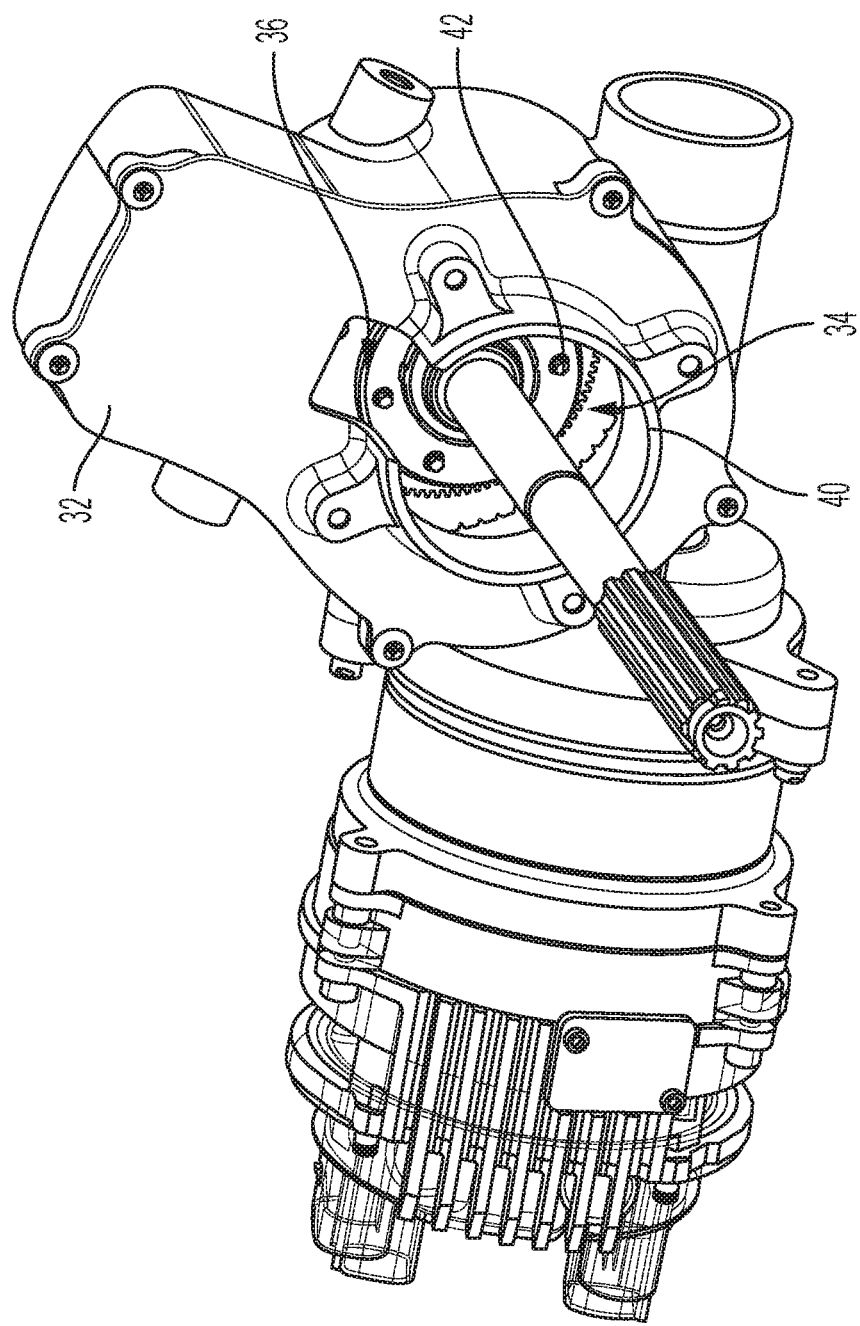
FIG. 7 is a perspective view of the steering actuator having the connector plate and sealing member.

Referring to FIGS. 5-7, the connector plate 32 includes a flange 40 that extends at least partially about the opening 34 and is interrupted by the channel 36. The flange 40 extends at least partially into the lower jacket assembly 24. In some embodiments, disposed within the opening 34 is a sealing member 42, such as a rubber membrane, that is retained within the channel 36 and/or the opening 34 of the connector plate 32. The sealing member 42 inhibits the ingress of foreign material or foreign objects from entering the actuator housing 30. The sealing member 42 is a flexible member that is sized to allow the jacket assembly 14 to extend through the sealing member 42 and be received within the actuator housing 30 during a steering column collapse event.

The sealing member 42 defines a central opening 44 through which at least a portion of the steering shaft 12 extends. The central opening 44 is sized such that there is sufficient clearance to not affect turning torque applied to the steering shaft 12.

The sealing member 42 is arranged as a collapsible membrane that facilitates the stroking or collapsing of the steering column assembly 10. The sealing member 42 may be perforated or include stress reduction features or tear away zones 46 (FIG. 6) to ensure the ability of the collapsing energy absorption assembly 16 and the upper jacket 26 to collapse into the actuator housing 30.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

The invention claimed is:

1. A steering column assembly comprising:
   a jacket assembly;
   a steering actuator operatively coupled to the jacket assembly with a connector plate, the connector plate defining an opening having a main portion and a channel extending radially outward from the main portion of the opening;
   a sealing member retained within the opening, the sealing member being formed of a flexible material and having a plurality of tear away zones to define circumferential segments of the sealing member;
   a steering shaft extending through the opening of the connector plate, wherein the sealing member defines a central aperture surrounding the steering shaft, the steering shaft and the sealing member defining a clearance therebetween.

2. The steering column assembly of claim 1, further comprising an energy absorption assembly operatively coupled to the jacket assembly, the channel positioned and sized to receive at least a portion of the energy absorption assembly during collapse of the steering column assembly.

3. The steering column assembly of claim 1, wherein an overall collapse zone includes a first collapse zone defined by the jacket assembly and a second collapse zone defined by the steering actuator.

* * * * *